US007316528B2

(12) United States Patent
Cooper et al.

(10) Patent No.: US 7,316,528 B2
(45) Date of Patent: Jan. 8, 2008

(54) ERGONOMIC ROUTER ASSEMBLY

(75) Inventors: Randy G. Cooper, Jackson, TN (US); Mark A. Etter, Humboldt, TN (US); Greg K. Griffin, Humboldt, TN (US); Ginger L. Allen, Jackson, TN (US); Derrick Kilbourne, Jackson, TN (US)

(73) Assignee: Black & Decker Inc., Newark, DE (US)

( * ) Notice: Subject to any disclaimer, the term of this patent is extended or adjusted under 35 U.S.C. 154(b) by 438 days.

(21) Appl. No.: 10/740,235

(22) Filed: Dec. 18, 2003

(65) Prior Publication Data

US 2006/0104737 A1 May 18, 2006

Related U.S. Application Data

(63) Continuation-in-part of application No. 10/686,300, filed on Oct. 15, 2003, now abandoned.

(60) Provisional application No. 60/467,169, filed on May 1, 2003, provisional application No. 60/418,510, filed on Oct. 15, 2002.

(51) Int. Cl.
*B23C 1/20* (2006.01)

(52) U.S. Cl. ............... 409/182; 144/136.95; 144/154.5

(58) Field of Classification Search ................ 409/181, 409/182, 175, 178, 180, 138, 179; 144/136.95, 144/154.5; 173/218
See application file for complete search history.

(56) References Cited

U.S. PATENT DOCUMENTS 220,759 A * 10/1879 Hirschfeld .................. 409/181
542,568 A 7/1895 Miller
712,843 A 11/1902 Paul
1,370,895 A 3/1921 Loomis
1,514,894 A 11/1924 Carter
1,565,790 A 12/1925 Carter
1,584,078 A 5/1926 Carter
1,820,162 A 8/1931 Salvat
1,874,232 A 8/1932 Groene et al.
2,155,082 A * 4/1939 Decker ....................... 173/217

(Continued)

FOREIGN PATENT DOCUMENTS

CA 500134 2/1954 ............ 144/134 D (Continued)

OTHER PUBLICATIONS http://www.dremel.com/productdisplay/tool_template2.asp?SKU=9000-04&Color=99CCFF, #9000-04 Advantage Rotary Saw Kit, Mar. 21, 2003, 1 page.

(Continued)

*Primary Examiner*—Daniel W. Howell
(74) *Attorney, Agent, or Firm*—Scott B. Markow

(57) ABSTRACT

An ergonomically designed router assembly includes a base assembly coupled with a motor casing including a grip assembly which provides an overall narrower profile to the router assembly. The grip assembly may relieves stress on the muscles and allows the operator to more securely grasp the router with one hand thus decreasing fatigue levels as compared to those routers which require both hands of the operator to be engaged for control over the router.

30 Claims, 9 Drawing Sheets

U.S. PATENT DOCUMENTS 2,238,304 A * 4/1941 Belanger .................... 409/178
2,353,202 A 7/1944 Tautz ......................... 144/134
2,425,245 A 8/1947 Johnson ....................... 121/36
2,452,268 A * 10/1948 Schumann ................... 173/75
2,504,880 A 4/1950 Rittenhouse
2,513,894 A 7/1950 Rogers
2,771,104 A * 11/1956 Saxe ....................... 144/114.1
2,799,305 A 7/1957 Groehn ....................... 144/253
2,946,315 A * 7/1960 Doeden ....................... 173/59
2,949,826 A * 8/1960 Weber ........................ 409/180
3,019,673 A * 2/1962 Zernell et al. .............. 173/219
3,162,221 A * 12/1964 Lacey ..................... 144/134.1
3,274,889 A * 9/1966 Ferris ......................... 409/180
3,285,135 A * 11/1966 Shaw ........................ 409/180
3,288,183 A * 11/1966 Eisbrenner ............... 144/136.1
3,289,718 A 12/1966 Willis ......................... 144/136
3,436,090 A 4/1969 Lange et al. ............. 280/11.37
3,443,479 A 5/1969 Hawley et al. ................ 90/12
3,451,133 A 6/1969 Hathaway et al.
3,466,973 A 9/1969 Rees
3,481,453 A 12/1969 Shreve, III et al.
3,487,747 A 1/1970 Burrows et al.
3,490,502 A 1/1970 Willis
3,494,395 A 2/1970 Graham
3,512,740 A 5/1970 Podwany
3,587,387 A 6/1971 Burrowsm et al.
3,602,318 A * 8/1971 Slany ......................... 173/170
3,710,833 A 1/1973 Hammer et al.
3,752,241 A * 8/1973 Bent .......................... 173/221
3,762,452 A * 10/1973 Bernald ................... 144/154.5
3,767,948 A 10/1973 Batson ........................ 310/50
3,791,260 A 2/1974 Ambler et al. .............. 90/12 D
3,827,820 A 8/1974 Hoffman
3,905,273 A 9/1975 Shook
4,051,880 A 10/1977 Hestily
4,085,552 A 4/1978 Horine et al.
4,102,370 A 7/1978 Vess ....................... 144/134 D
4,108,225 A 8/1978 Hestily
4,143,691 A 3/1979 Robinson ................ 144/134 D
4,154,309 A * 5/1979 Sappington ................. 173/170
4,239,428 A 12/1980 Berzina ...................... 409/182
4,252,164 A 2/1981 Norlander
4,294,297 A 10/1981 Kieffer ................... 144/134 D
4,319,860 A 3/1982 Beares
D267,492 S 1/1983 Schieber
4,410,022 A 10/1983 Peterson ..................... 144/1 F
4,445,811 A 5/1984 Sanders ...................... 409/182
4,510,404 A 4/1985 Barrett et al.
4,537,234 A 8/1985 Onsrud ................... 144/134 A
D281,218 S 11/1985 Barrett et al.
4,562,872 A 1/1986 Fushiya et al. ............. 144/134
4,593,466 A 6/1986 O'Brien
D286,132 S 10/1986 Yamamoto .................... D8/67
4,615,654 A 10/1986 Shaw
4,640,324 A * 2/1987 Lounds .................... 144/154.5
4,652,191 A 3/1987 Bernier ....................... 409/182
4,679,606 A 7/1987 Bassett ................... 144/134 A
4,696,331 A * 9/1987 Irland ...................... 144/154.5
4,718,468 A 1/1988 Cowman ................ 144/134 D
4,738,571 A 4/1988 Olson et al.
4,770,573 A 9/1988 Monobe ..................... 409/182
4,776,374 A 10/1988 Charlebois
D300,501 S 4/1989 Zurwelle ...................... D8/67
4,830,074 A 5/1989 Lundblom
RE33,045 E 9/1989 Gronholz et al. ........... 144/134
4,872,550 A 10/1989 Stranges
4,919,176 A 4/1990 Gachet et al.
4,924,571 A 5/1990 Albertson
4,938,642 A 7/1990 Imahashi et al. ........... 409/182
5,005,617 A * 4/1991 Michaels ................. 144/154.5
5,012,582 A 5/1991 Bristol
5,025,841 A 6/1991 Totten .................... 144/134 R
5,056,375 A 10/1991 Kapton et al. ............. 74/89.15
5,062,460 A 11/1991 DeLine
5,074,724 A 12/1991 McCracken
5,078,557 A 1/1992 McCracken ................. 409/182
D323,935 S 2/1992 Ward
5,088,865 A 2/1992 Beth et al. .................. 409/182
5,094,575 A 3/1992 Kieser et al. ............... 409/182
D326,597 S 6/1992 Lee
5,117,879 A 6/1992 Payne
5,139,061 A 8/1992 Neilson .................. 144/134 A
5,181,813 A 1/1993 McCracken
5,188,492 A 2/1993 McCracken
5,191,621 A 3/1993 Brok ............................ 382/1
D337,501 S 7/1993 Witt ............................ D8/70
D340,174 S 10/1993 Hoshino et al. ............... D8/67
D341,305 S 11/1993 Svetlik ......................... D8/70
5,265,657 A 11/1993 Matsumoto et al. .... 144/134 D
5,273,089 A 12/1993 Fuchs et al. ............ 144/134 D
5,289,861 A 3/1994 Hedrick .................. 144/134 A
5,308,201 A 5/1994 Wilson et al. .............. 409/134
D349,637 S 8/1994 Hoshino et al. ............... D8/67
5,347,684 A 9/1994 Jackson .................... 16/111 R
5,353,474 A 10/1994 Good et al. ............... 16/111 R
5,353,852 A 10/1994 Stolzer et al. .......... 144/134 D
5,361,851 A 11/1994 Fox ........................... 173/170
5,368,424 A 11/1994 Battenhausen .............. 409/182
5,429,235 A 7/1995 Chen .......................... 206/373
5,445,479 A 8/1995 Hillinger ..................... 408/16
5,452,751 A 9/1995 Engler, III et al. ......... 144/1 F
5,469,601 A 11/1995 Jackson .................... 16/111 R
5,511,445 A 4/1996 Hildebrandt ............. 745/558.5
5,584,620 A 12/1996 Blickhan et al. ............ 409/137
5,590,989 A 1/1997 Mulvihill .................... 409/182
5,598,892 A 2/1997 Fox ........................... 173/170
5,613,813 A 3/1997 Winchester et al. ........ 409/182
5,640,741 A 6/1997 Yano ........................ 16/114 R
5,652,191 A 7/1997 Patterson .................... 502/162
5,662,440 A 9/1997 Kikuchi et al. ............. 409/182
5,671,789 A 9/1997 Stolzer et al. ........... 144/154.5
5,678,965 A 10/1997 Strick ......................... 409/132
5,699,844 A 12/1997 Witt ........................... 144/329
5,725,036 A 3/1998 Walter ..................... 144/135.2
5,740,847 A * 4/1998 Lakso ................... 144/144.52
5,743,686 A * 4/1998 Montgomery ............... 409/181
5,772,368 A 6/1998 Posh .......................... 409/182
5,803,684 A 9/1998 Wang ......................... 409/229
5,813,805 A * 9/1998 Kopras ................... 408/241 R
5,829,931 A 11/1998 Doumani .................... 409/132
5,853,273 A 12/1998 Coffey ........................ 409/182
5,853,274 A 12/1998 Coffey et al. ............... 409/182
5,902,080 A 5/1999 Kopras ....................... 409/182
5,909,987 A 6/1999 Coffey et al. ............... 409/131
5,913,645 A 6/1999 Coffey ........................ 409/182
5,918,652 A 7/1999 Tucker ....................... 144/371
5,921,730 A 7/1999 Young et al. ............... 409/182
D416,460 S 11/1999 Bosten et al. .................. D8/67
5,988,241 A 11/1999 Bosten et al. ............ 144/154.5
5,998,897 A 12/1999 Bosten et al. ................. 310/89
6,004,082 A * 12/1999 Ruhlmann et al. .......... 408/1 R
6,050,759 A 4/2000 Bone .......................... 409/182
6,065,912 A 5/2000 Bosten et al. ............... 409/134
6,079,915 A 6/2000 Bosten et al. ............... 409/182
6,079,918 A 6/2000 Buddendeck et al. ....... 409/182
6,182,723 B1 2/2001 Bosten et al. ............ 144/154.5
6,183,400 B1 2/2001 Pope ........................... 482/92
D444,364 S 7/2001 Evans .......................... D8/67
6,261,036 B1 7/2001 Bosten et al. ............... 409/182
6,266,850 B1 7/2001 Williams et al. .............. 16/430
6,289,952 B1 9/2001 Jones et al. .............. 144/135.2
6,305,447 B1 10/2001 Rousseau ................ 144/135.2
6,308,378 B1 * 10/2001 Mooty et al. ................. 16/430
6,318,936 B1 11/2001 McFarlin, Jr. et al. ...... 409/131

| | | | | |
|---|---|---|---|---|
| 6,386,802 | B1 * | 5/2002 | Negri et al. | 408/1 R |
| 6,419,429 | B1 | 7/2002 | Long et al. | 409/182 |
| 6,443,675 | B1 | 9/2002 | Kopras et al. | 409/182 |
| 6,443,676 | B1 | 9/2002 | Kopras | 409/182 |
| 6,461,088 | B2 * | 10/2002 | Potter et al. | 408/124 |
| 6,474,378 | B1 | 11/2002 | Ryan et al. | 144/154.5 |
| 6,505,659 | B1 | 1/2003 | Hummel | 144/135.2 |
| 6,520,224 | B2 | 2/2003 | Smith | 144/135.2 |
| 6,520,227 | B2 | 2/2003 | Mc Farlin, Jr. et al. | 144/371 |
| D473,439 | S | 4/2003 | Grant et al. | D8/61 |
| 6,550,154 | B1 | 4/2003 | Smith | 33/638 |
| 6,725,892 | B2 | 4/2004 | McDonald et al. | 144/136.95 |
| 6,726,414 | B2 | 4/2004 | Pientka et al. | 409/182 |
| 6,739,066 | B2 | 5/2004 | Smith | 33/638 |
| 6,779,954 | B2 | 8/2004 | Tomayko | 409/182 |
| 6,792,984 | B2 | 9/2004 | Fontaine | 144/135.2 |
| 6,835,032 | B1 * | 12/2004 | Pozgay et al. | 409/182 |
| 2002/0020466 | A1 | 2/2002 | McFarlin, Jr. et al. | 144/135.2 |
| 2002/0043294 | A1 | 4/2002 | McDonald et al. | 144/154.5 |
| 2002/0079021 | A1 | 6/2002 | Smith | 144/135.2 |
| 2002/0122706 | A1 * | 9/2002 | Chen | 408/113 |
| 2002/0131834 | A1 * | 9/2002 | Lui et al. | 408/124 |
| 2003/0188441 | A1 | 10/2003 | Patton | 30/381 |
| 2003/0205292 | A1 | 11/2003 | Smith | 144/252.1 |
| 2003/0221292 | A1 * | 12/2003 | Pozgay et al. | 16/422 |
| 2003/0223835 | A1 | 12/2003 | Hummel | 409/182 |
| 2004/0035495 | A1 | 2/2004 | Hessenberger et al. | 144/136.95 |
| 2004/0194854 | A1 | 10/2004 | McDonald et al. | 144/136.95 |
| 2004/0200543 | A1 | 10/2004 | McDonald et al. | 144/136.95 |
| 2004/0250891 | A1 | 12/2004 | McDonald et al. | 144/136.95 |
| 2004/0253068 | A1 | 12/2004 | Gerhardt et al. | 409/182 |
| 2005/0152759 | A1 * | 7/2005 | Allemann et al. | 409/181 |

FOREIGN PATENT DOCUMENTS

| | | | |
|---|---|---|---|
| CA | 657748 | 2/1963 | 144/136 |
| CA | 2314653 | 7/2000 | |
| GB | 712071 | 4/1952 | |
| GB | 1037969 | 9/1965 | |
| JP | 55-142145 | 4/1979 | |
| JP | 05-318408 | 12/1993 | |
| JP | 05-318409 | 12/1993 | |
| JP | 07-100801 | 6/1994 | |
| JP | 06-339875 | 12/1994 | |

OTHER PUBLICATIONS

Bosch 1617 Shop Router, Parts Diagram, Jul. 1998.
Bosch Router Models, Owners Manual, p. 1-22, http//www.boschtools.com.
Triton TRC-001 Review, 3.25 Plunge Router, http://www.mv.com/users/besposito/woodworking/triton/, Feb. 27, 2004.
Triton ½" Precision Router (TRA 001), http://www.triton.net.au/products/router_2.html, p. 1-3, Feb. 27, 2004.
Triton TRC-001, Router Woodworking, http://www.patwarner.com/triton.html, p. 1-2, Feb. 27, 2004.
Triton 3 ¼hp Plunge Router Review, http:/benchmark.20m.com/reviews/TritonRouter/TritonRouterReview.html,, p. 1-4, Feb. 27, 2004.

* cited by examiner

ERGONOMIC ROUTER ASSEMBLY

CROSS REFERENCE TO RELATED APPLICATION

The present application is a continuation-in-part under 35 U.S.C. §120 of the U.S. application Ser. No. 10/686,300, filed on Oct. 15, 2003 now abandoned, which claims the benefit under 35 U.S.C. §119(e) of the U.S. Provisional Application Ser. No. 60/418,510, filed on Oct. 15, 2002, and claims the benefit under 35 U.S.C. §119(e) of the U.S. Provisional Application Ser. No. 60/467,169, filed on May 1, 2003. Said U.S. Provisional Application Ser. No. 60/418,510 and said U.S. Provisional Application Ser. No. 60/467,169 are herein incorporated by reference in their entireties.

The present application herein incorporates U.S. application Ser. No. 10/384,510, filed Mar. 7, 2003, and U.S. application Ser. No. 10/458,167, filed Jun. 10, 2003 by reference in their entireties.

FIELD OF THE INVENTION

The present invention generally relates to the field of power tools, and particularly to an ergonomically designed power tool, such as a router.

BACKGROUND OF THE INVENTION

Routers are employed to accomplish a variety of tasks. Used for shaping objects typically composed of wood, plastic, metal, and the like, routers have become a mainstay of the construction work site and home work shops. From handles located on either side of the housing, to attachments which extend away from the housing, to base designs which allow an operator to guide the operation of the router, controlling the router while in operation has been the purview of many design configurations. And in typical workman-like fashion the design of these handles have often been focused on functionality and not taken into account ergonomic considerations.

Typically, ergonomic designs have focused on the structure of the handles and/or external attachments to the routers. For instance, differently shaped handles or various attachment angles thought to provide easier functionality. Additionally, typical router configurations may require the user to grasp the motor housing of the router. These motor housings, surround the motor, and typically leave unused space between the interior of the walls of the housing and the windings of the motor. This may result in a large housing of the router, which may be difficult for the user to firmly grasp, thus, limiting the effective control over the router. Further, the demands placed on the hands of the user, in grasping the large motor housing, may increase fatigue levels which may decrease productivity. Unfortunately, attempts to construct more ergonomically configured routers have fallen short of the goal of providing a significantly easier to operate router.

Therefore, it would be desirable to provide an ergonomically designed router to reduce fatigue and improve control over the router.

SUMMARY OF THE INVENTION

Accordingly, the present invention is directed to a router with an ergonomically designed base and motor casing. Ergonomic design features function to relieve stress on the parts of an operator being used to operate a machine. For instance, providing a thinner handle enables the hand to more comfortably grip an object. This in turn relieves stress on the muscles used for gripping which in turn decreases fatigue levels in those muscles and increases overall performance of the muscles. In the present invention, an ergonomically designed motor casing provides an overall narrower profile, reducing the amount of unused space between the interior of the walls of the motor casing and the windings of the motor. Additionally, a base with a hand cradle assembly is provided for engaging the side of the hand of an operator. These features provide support to the hand of the operator which relieves stress on the muscles and allows the operator to firmly grasp the router with one hand thus decreasing fatigue levels as compared to those routers which require both hands of the operator to be engaged for control over the router.

The present invention, further enables the hand of the operator to engage with a grip assembly which provides additionally ergonomic functionality. The grip assembly is designed to incorporate materials which engage the hand of the operator with material as opposed to the metal of the motor casing. The material is designed to flexibly engage the hand of the operator and provide absorption of operational stresses. Such flexible engagement may comprise a grip zone which provides a flexible or cushioned gripping region for the hand of the operator. Operational stress absorption may be provided by the choice of materials employed on the grip assembly, for instance a firmer material may provide a firmer grip region but translate stresses, such as vibrations, at a higher rate than a more flexible material.

It is an object of the present invention to provide a router which is ergonomically designed to increase operator comfort and control when operating the router. It is a further object of the present invention to reduce muscle fatigue and the concomitant productivity decrease experienced by users of typical routers.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1A:
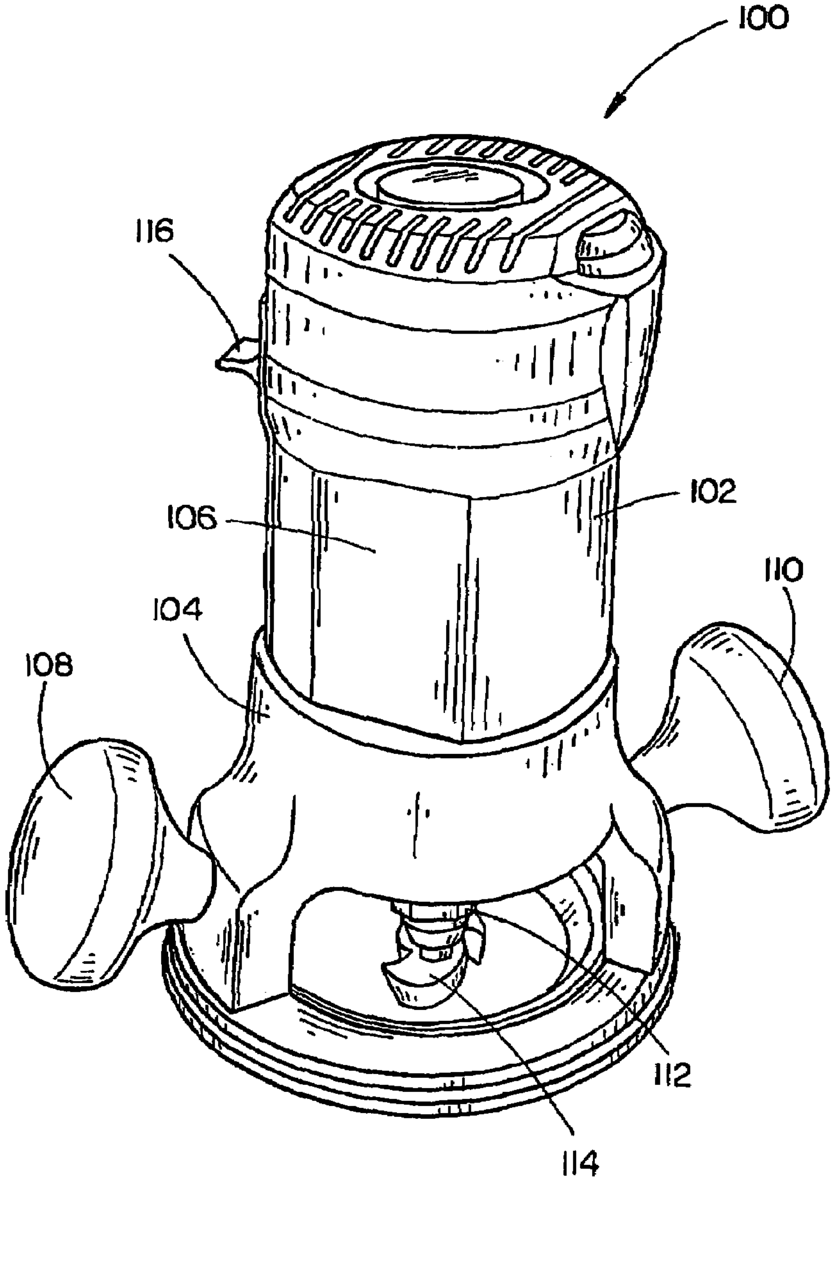
FIG. 1A is an illustration of a router assembly including a motor casing, comprising a grip assembly including a first grip zone, coupled with a base assembly in accordance with an exemplary embodiment of the present invention.

Reference will now be made in detail to the presently preferred embodiments of the invention, examples of which are illustrated in the accompanying drawings.

Referring generally now to FIGS. 1A through 6, exemplary embodiments of the present invention are shown.

A router assembly 100 including a motor casing 102 coupled with a base assembly 104, is shown in FIGS. 1A through 1D. The motor casing 102 is generally configured to surround a motor. The motor casing 102 is disposed with a first grip zone 106 of a grip assembly 105. The grip assembly, in the current embodiment, includes the first grip zone 106 disposed on the motor casing 102 in a location proximal to a first knob handle 108 coupled with the base assembly 104. The base assembly 104 is coupled with the first knob handle 108 and a second knob handle 110.

In the preferred embodiment, the grip assembly is integrally defined within the configuration of the motor casing 102. In alternative embodiments, the grip assembly may be established in a variety of ways as contemplated by those of ordinary skill in the art. The dimensions established by the configuration of the motor casing 102, including the first grip zone 106 of the grip assembly 105, may substantially correspond to a grasp size of an average human hand. The grasp size being defined generally as the area circumscribed by a grasp of a thumb and forefingers of the average human hand. It is understood that the motor casing 102, which at least partially encompasses a motor (i.e., motor windings), including the grip assembly 105 may provide a configuration which may result in the increased ease of operation of the router and reduction of muscle fatigue in an operator of the router. In alternative embodiments, the motor casing 102 may assume a variety of configurations, which enable the motor casing 102 to surround the windings of the motor and provide similar advantages. It is understood that alternate configuration parameters may be employed without departing from the scope and spirit of the present invention.

The motor casing 102 encompasses the motor which includes a router bit engagement assembly 112 that couples with a router bit 114. An actuator 116 is disposed upon the motor casing 102 for selecting the operation of the router assembly 100. It is contemplated that the motor casing 102 may be removed from the base assembly 104. This may allow a secondary motor casing to be coupled with the base assembly 104 or a secondary base assembly, such as a plunge base assembly, to be coupled with the motor casing 102, thereby increasing the functionality of the motor casing 102 and the base assembly 104.

In the preferred embodiment, the first grip zone 106 of the grip assembly 105 provides an operator a flat surface with which to engage the hand of the operator. Thus, the first grip zone 106 establishes a flat side which may make grasping engagement of the router assembly 100 by the hand of the operator more secure and may decrease fatigue in the hand of the operator. It is understood that the first grip zone 106 may establish various ergonomically correct configurations for the grasping of the router 100 by the hand of the operator without departing from the scope and spirit of the present invention. For example, the first grip zone 106 may be configured with contoured grooves for engaging with individual fingers of the hand of the operator. Alternatively, the first grip zone 106 may be configured with alternating flat regions and rounded regions.

In the present embodiment, the first grip zone 106 is disposed on the motor casing 102 proximal to the first knob handle 108. This location is exemplary for an operator who is right-hand dominant, allowing the operator to engage the dominant hand with the flat surface securing the router assembly 100 in the grasp of the operator. It is understood that the location of the first grip zone 106 may be adjusted to accommodate an operator with a left-hand dominance. In such an instance, the first grip zone 106 may be located proximally to the second knob handle 110.

Figure 1B:
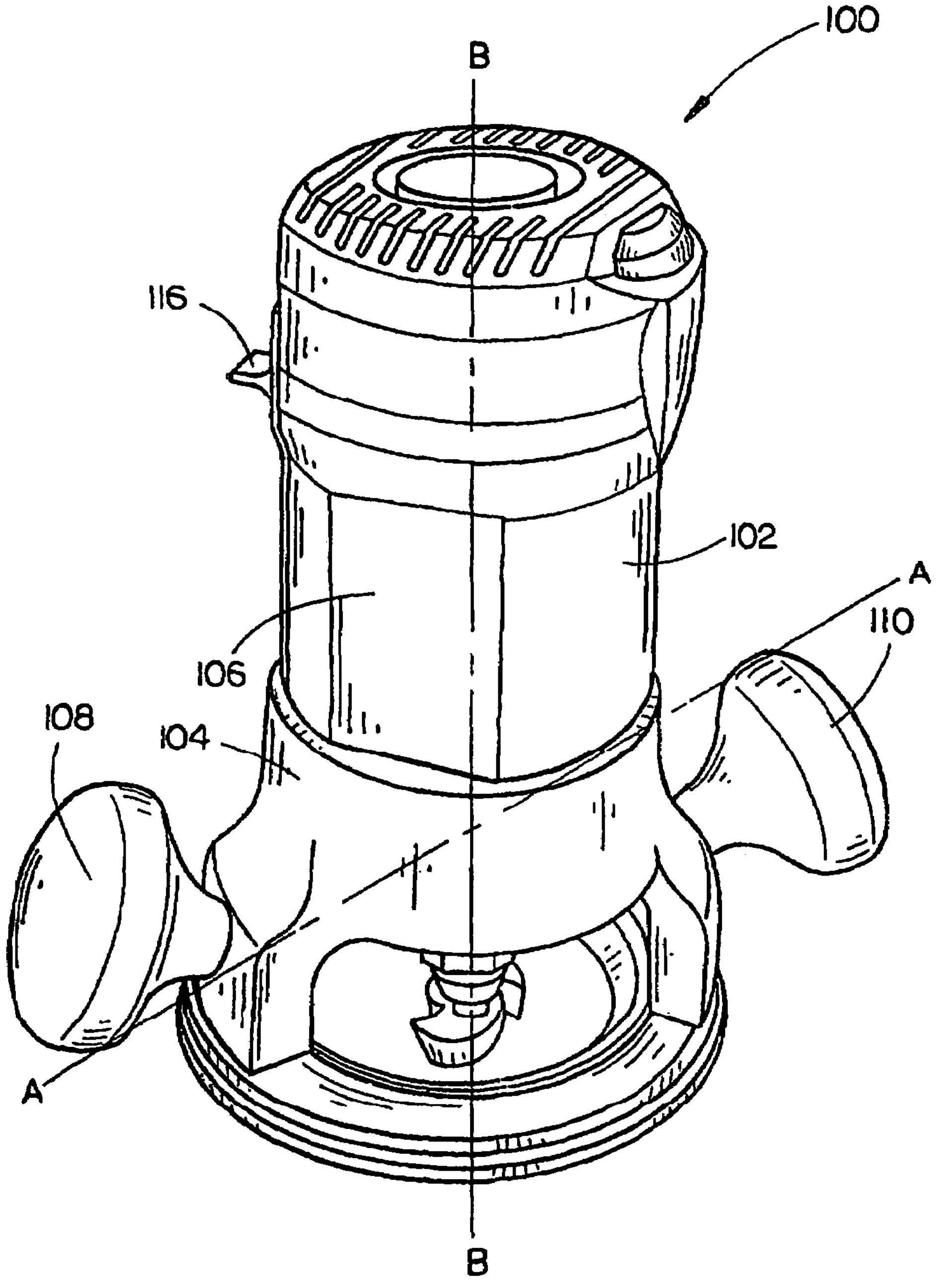
FIG. 1B is an illustration of the router assembly comprising the motor casing coupled with the base assembly, including identification of a horizontal main axis and a vertical main axis of the base assembly, wherein the motor casing presents at a zero degree position relative to the base assembly.
Figure 1D:
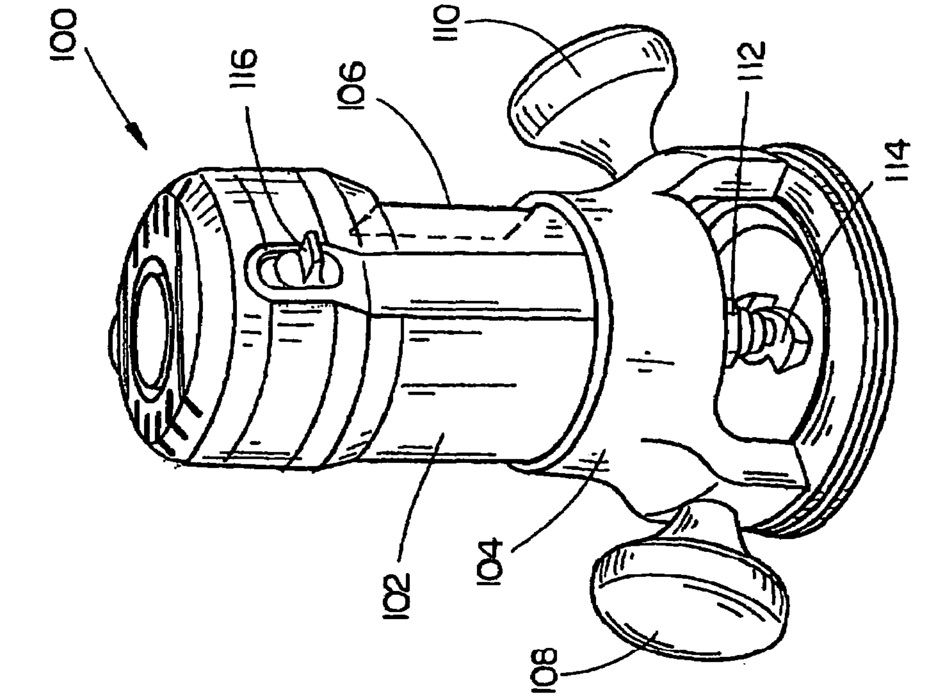
FIG. 1D illustrates the router assembly wherein the motor casing presents at a one hundred eighty degree angle, from the zero degree position, relative to the base assembly.

The position of the first grip zone 106 is changed through use of an adjustment assembly which enables the position of the motor casing 102, and thusly the first grip zone 106, to be adjusted in various positions relative to the base assembly 104. As shown in FIG. 1B a main horizontal axis ‘A’ and a main vertical axis ‘B’ may be established for identifying the position of the motor casing 102 relative to the base assembly 104. For instance, the motor casing 102 and the first grip zone 106 may be located approximately between the first and second knob handles. The various presentation positions of the motor casing 102 and the first grip zone 106 is enabled through the operational coupling of the adjustment assembly with the motor casing 102 and the base assembly 104. Thus, the motor casing 102 is able to present at various angles relative to a horizontal main axis ‘A’ and the vertical main axis ‘B’. This adjustment capability may promote use of the router assembly 100 when the motor casing 102 is positioned below the operator’s elbow.

The adjustment assembly, in preferred embodiments, may comprise a variety of systems allowing for releasing, adjusting, and securing the position of the motor casing 102 relative to the base assembly 104. For example, a pin alignment system may employ one or more pins which may be removably coupled with one or more grooves disposed within the base assembly 104. The pins may removably engage with the motor casing 102, through a boss assembly, and the like, and into the one or more grooves. This type of assembly allows for pre-set angular adjustments to be made.

Other assemblies may allow for a user of the present invention to establish a plurality of discrete positions through angular adjustment of the motor casing 102 relative to the base assembly 104. For example, a compression lock assembly comprising a sleeve defining an open and closed position, disposed within the base assembly 104 and at least partially surrounding the motor casing 102, may be engaged by a fastener which allows the operator to secure the sleeve in either the open or closed position. When in the open position the operator may rotate the motor casing 102 relative to the base assembly 104 without being limited by pre-set angular adjustment sites. Once the operator has established the desired position of the motor casing 102 relative to the base assembly 104, the operator may engage the fastener, thereby establishing the sleeve in the closed position. In the closed position the sleeve secures the position of the motor casing 102.

In a still further alternative, the fastening assembly may include a latch assembly which may be released to allow the position of the motor casing 102 to be adjusted relative to the base assembly 104. Once the new position of the motor casing 102 is established the latch assembly may be engaged to secure the new position and prevent further movement of the motor casing 102 during operation of the router assembly 100. It is understood that a variety of fastening assemblies may be employed, such as a strap lock assembly, and the like. Alternatively, the fastening assembly may employ fasteners, such as bolts, screws, clips, and the like, which may secure the position of the motor casing 102 relative to the base assembly 104. It is understood that alternate configurations of the adjustment assembly as contemplated by those of ordinary skill in the art may be employed without departing from the scope and spirit of the present invention.

Figure 1C:
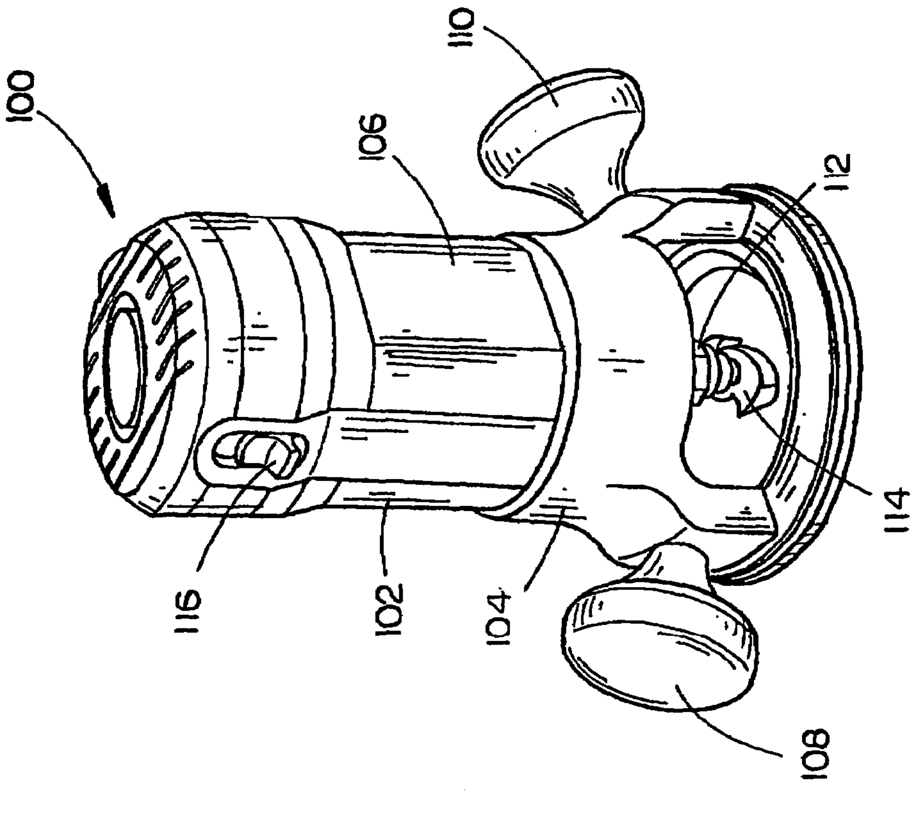
FIG. 1C illustrates the router assembly wherein the motor casing presents at a ninety degree angle, from the zero degree position, relative to the base assembly.

As shown in FIG. 1B, the motor casing 102 is at a zero degree position, relative to the horizontal main axis 'A' of the base assembly 104, when the first grip zone 106 is located proximal to the first knob handle 108. The motor casing 102 may be rotated, relative to the base assembly 104, thereby presenting the first grip zone 106 at various angles relative to the horizontal main axis 'A' of the base assembly 104. In preferred embodiments, the motor casing 102 may be enabled to rotate on the horizontal axis 'A' from zero to three hundred sixty degrees or to a discrete position within this range, relative to the base assembly 104. As shown in FIG. 1C, the motor casing 102 may rotate so as to position the first grip zone 106 approximately ninety degrees from the initial horizontal zero degree position of FIG. 1B. In the exemplary embodiment of FIG. 1D, the motor casing 102 is rotated approximately one hundred eighty degrees on the horizontal axis 'A' from the zero degree position of FIG. 1B. In this embodiment the first grip zone 106 is proximal to the second knob handle 110, which may enable the use of the router assembly by an operator who is left hand dominant.

It is further contemplated that the adjustment assembly may promote the presentation of the motor casing 102 at various angles relative to the vertical main axis 'B' of the base assembly 104, as shown in FIG. 1B. Preferably, the range of angular adjustment of the motor casing 102 relative to the vertical main axis 'B' of the base assembly 104 is between zero to thirty degrees or zero to forty five degrees. Thus, the motor casing 102 may enhance the operator's ability to utilize the router assembly when the router assembly is positioned below the operator's elbow. In operation, when the motor casing 102 is presented at an angle relative to the vertical axis 'B' of the base assembly 104, the grip assembly may be located in various positions. For example, the grip assembly may be located on the underside of the motor casing 102 providing the first grip zone 106 in the area engaged by the fingers of the operator when gripping the angled motor casing 102.

Figure 2A:
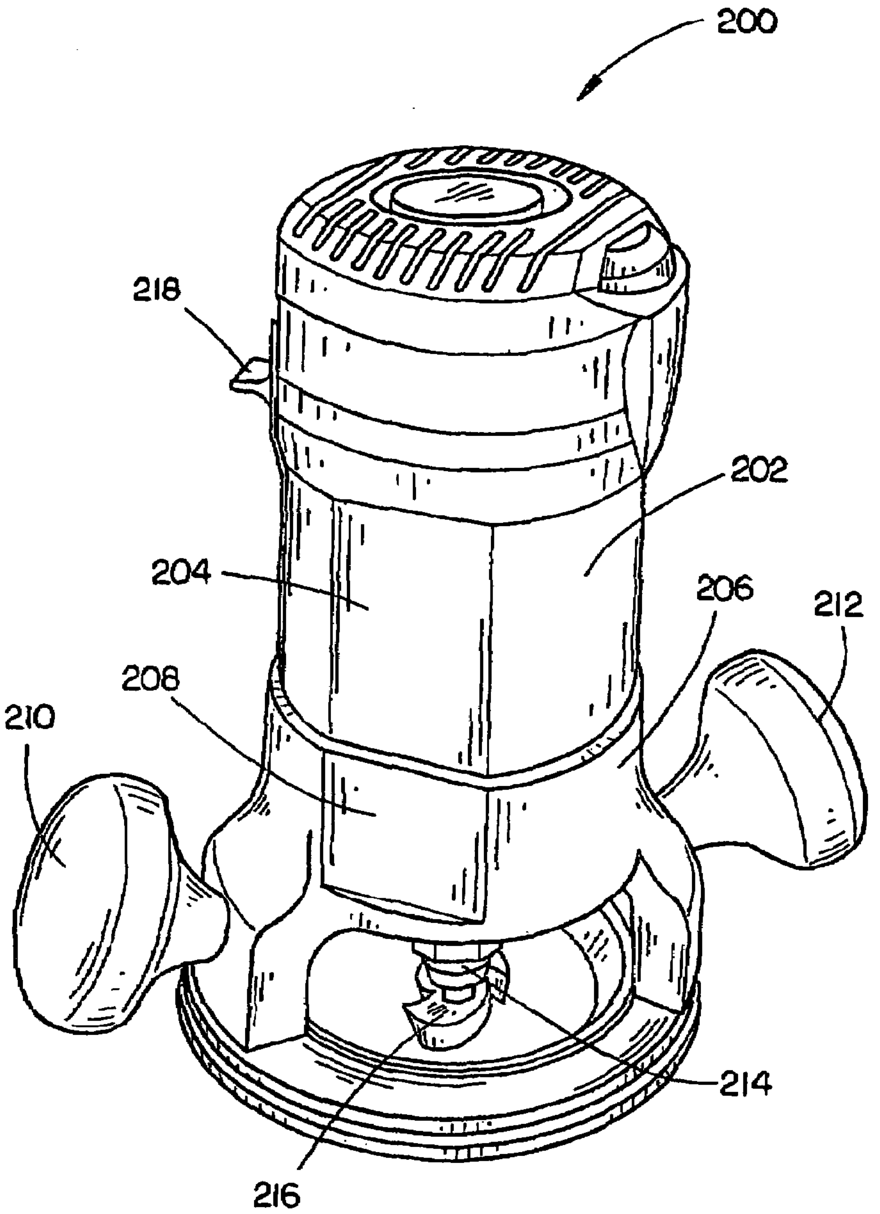
FIG. 2A is an illustration of a router assembly including a motor casing comprising a grip assembly including a first grip zone and a base assembly comprising a grip assembly including a first grip zone in accordance with an exemplary embodiment of the present invention.

Referring now to FIG. 2A, a router assembly 200 including a motor casing 202, disposed with a motor casing grip assembly comprising a first motor casing grip zone 204, is coupled with a base assembly 206 disposed with a base grip assembly comprising a base first grip zone 208, is shown. In the current embodiment, the first motor casing grip zone 204 and the base first grip zone 208 establish a generally flat gripping area for the hand of the operator. Similar to the grip zone for the router assembly 100, these two grip zones may be variously configured to provide increased grip-ability and comfort. In the exemplary embodiment, the base first grip zone 208 is located directly in line with the first motor casing grip zone 204 disposed on the motor casing 202. This alignment of the motor casing first grip zone 204 with the base first grip zone 208 provides an increased flat surface area with which the operator may grasp the router. This may enhance the operator's grasp of the router, control over the router, and may reduce muscle fatigue due to gripping the router assembly 200. It is understood that the router assembly 200 may include similar angular adjustment capabilities as described above with respect to FIGS. 1A through 1D. Therefore, the positioning of the motor casing first grip zone 204 may vary relative to the position of the base first grip zone 208.

It is contemplated that the base grip assembly include a base second grip zone. The base second grip zone may be aligned with a second motor casing grip zone of the motor casing grip assembly, providing an overall narrower profile to the router assembly 200. It is further contemplated that the motor casing grip assembly and the base grip assembly may include first and second grips coupled with the first and second grip zones disposed upon the motor casing and the base assembly. The grips may provide vibration dampening and may reduce the heat transfer from the router assembly to the hand of an operator.

The router assembly 200 further includes a first knob handle 210 and a second knob handle 212 coupled with the base assembly 206. A router bit engagement assembly 214 is coupled with a router bit 216, the router bit engagement assembly 214 is also coupled with a motor which is disposed within the motor casing 202. An actuator 218 is disposed on the motor casing 202 for controlling the operation of the router assembly 200. It is contemplated that the base assembly 206 disposed with the base first grip zone 208 and the motor casing 202 disposed with the first motor casing grip zone 204 may present at an angle relative to a main axis of the router bit engagement assembly 214 and the router bit 216. Providing an angled motor casing 202 and base assembly 206 may allow the operator to utilize the router with the router positioned below the operator's elbow.

Figure 2B:
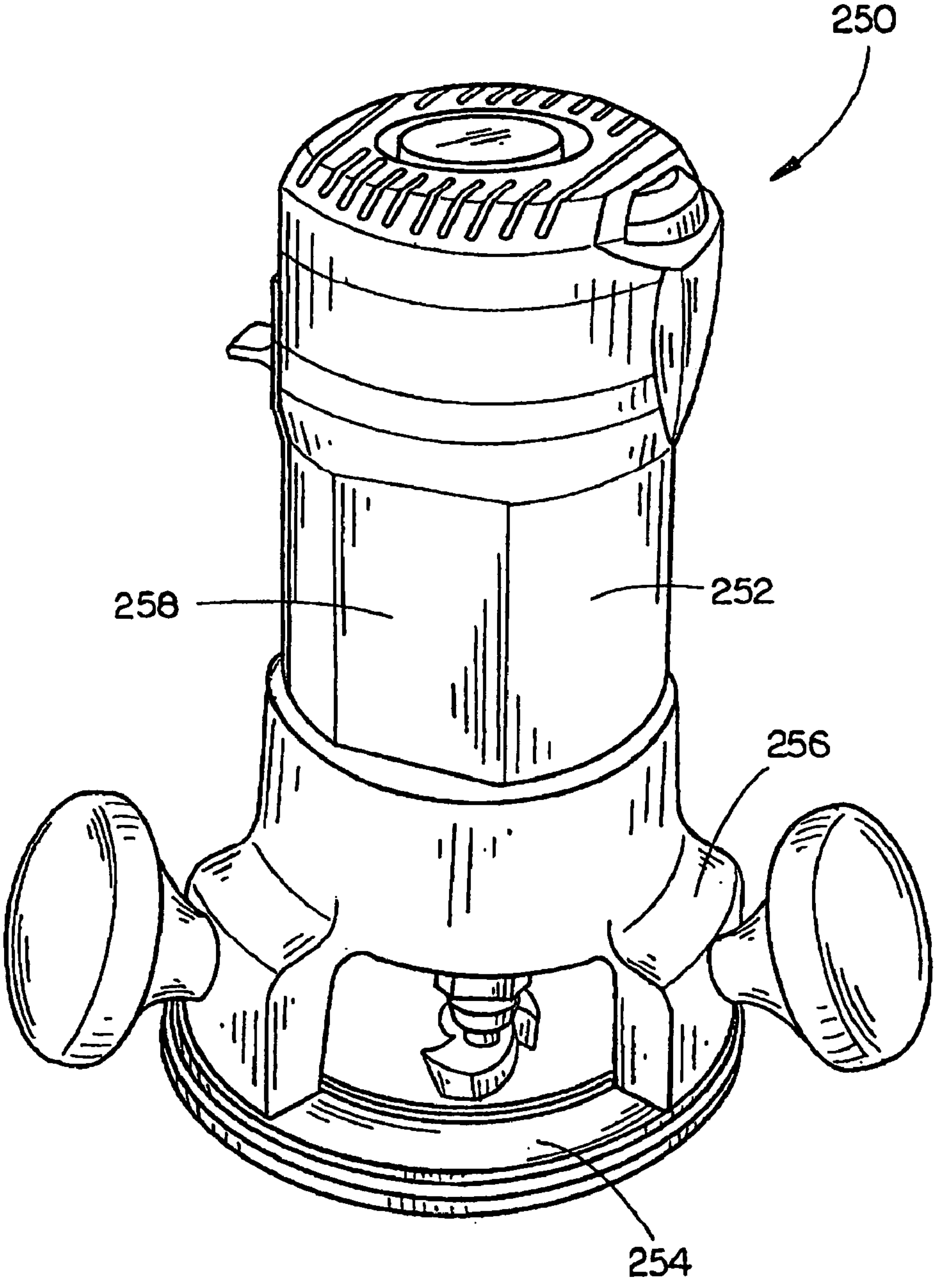
FIG. 2B is an illustration of a router assembly including a motor casing comprising a grip assembly including a first grip zone and a base assembly comprising a hand cradle assembly.

In the embodiment shown in FIG. 2B, a router assembly 250 includes a hand cradle assembly comprising a cradle 256. In the preferred embodiment, the cradle 256 is enabled as a ledge. It is understood that the raised portion, established by the cradle 256, may be enabled in variety of configurations without departing from the scope and spirit of the present invention. Further, the ledge 256 may be ergonomically configured to engage fully and in the most comfortable manner with the hand of the operator. It is contemplated that the ledge assembly may include an actuator for selecting the operation of the router assembly 250. In the exemplary embodiment, the ledge 256 is disposed on a base assembly 254 and is located directly in line with a first motor casing flat side 258 disposed on a motor casing 252. The ledge 256 may be engaged by the hand of the operator, allowing the hand to rest against the ledge 256 which may reduce muscle fatigue. In the preferred embodiment, the ledge 256 is aligned with the first grip zone 258. Alternatively, the ledge 256 may be in various locations relative to the first grip zone 258, as enabled by the angular adjustment capabilities of the router assembly 250 which are similar to those shown and described in FIGS. 1A through 1C for router assembly 100.

Figure 2C:
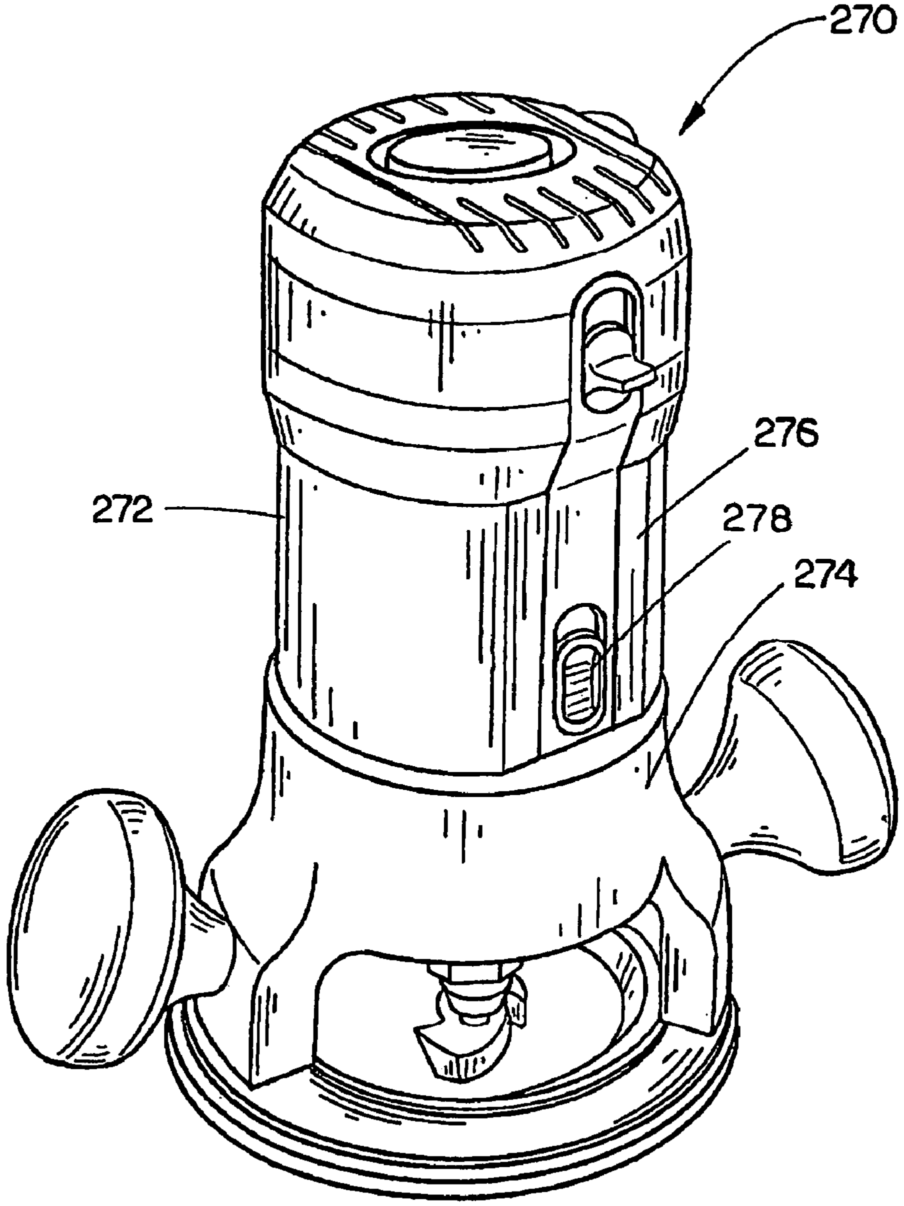
FIG. 2C is an illustration of a router assembly comprising a motor casing including a first grip zone disposed with an actuator for controlling operation of the router assembly.

As shown in FIG. 2C, a motor casing 272, coupled with a base assembly 274, comprises a first grip zone 276 including a first actuator 278 for controlling operation of a router assembly 270. The actuator 278 may be a variety of configurations, such as a two position "on/off" switch, a toggle switch, a button assembly, and the like. It is understood that the positioning of the actuator 278 may increase the ease of controlling the operation of the router assembly 270. Further, the actuator 278 may be positioned at a bottom or top end of the first grip zone 276 in order to promote efficient control of the motor during operation of the router assembly 270. Each actuator assembly may be operationally coupled with the motor to control the operation of the motor.

Figure 4:
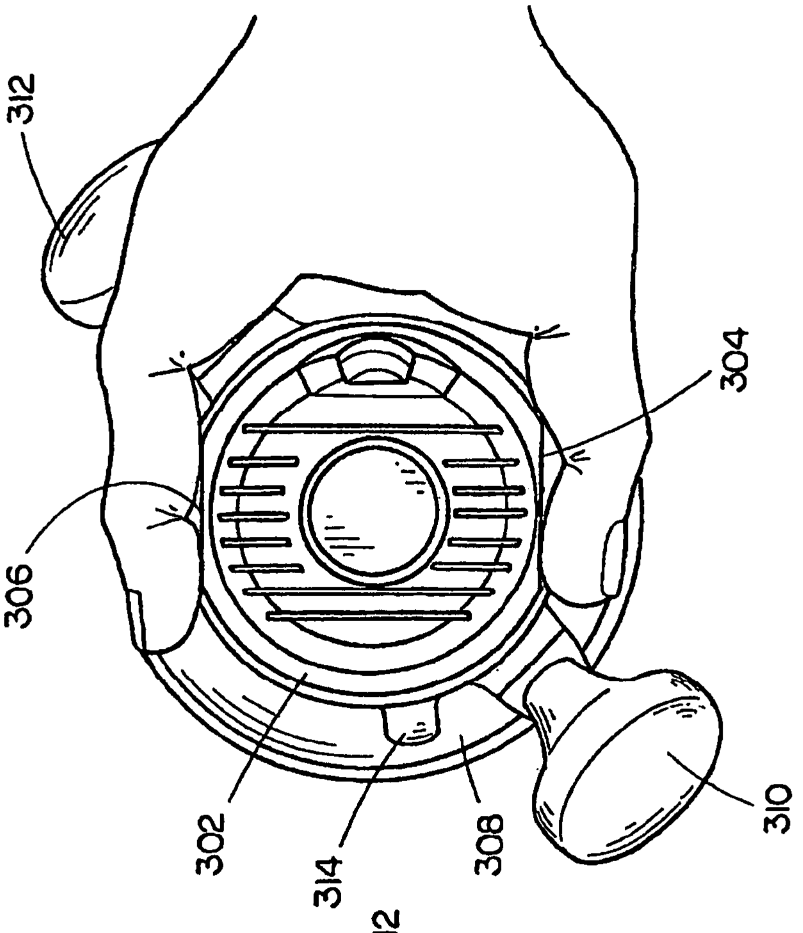
FIG. 4 is a top plan view of the router assembly, shown in FIG. 3.
Figure 3:
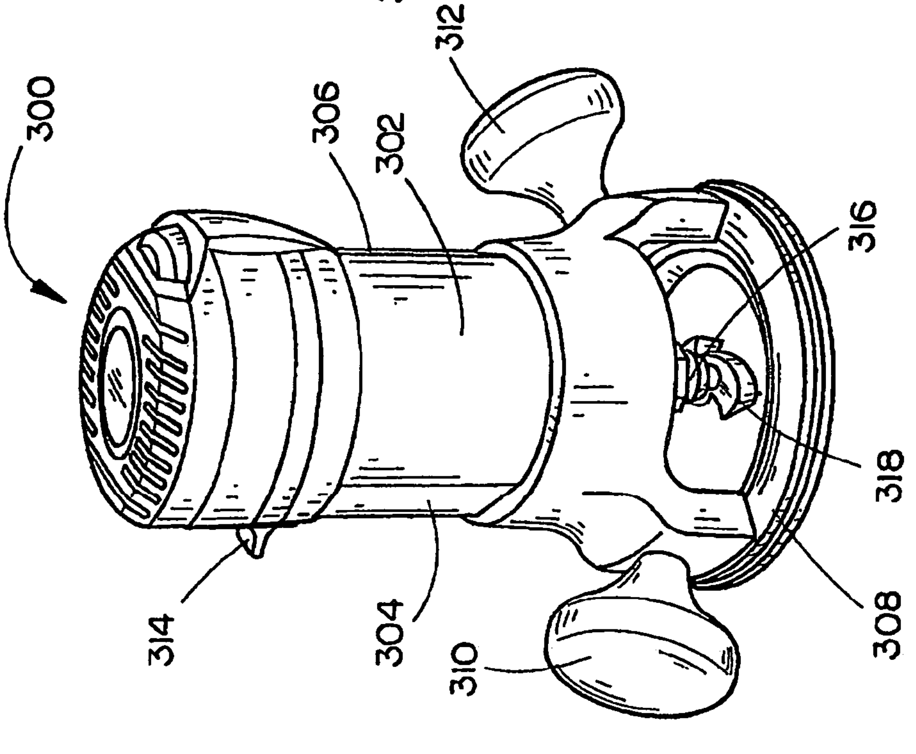
FIG. 3 is an illustration of a router assembly including a motor casing comprised of a grip assembly including a first grip zone and a second grip zone.

Referring now to FIGS. 3 and 4, a router assembly 300 is shown. The router assembly 300 includes a motor casing 302 disposed with a grip assembly comprising a first grip zone 304 and a second grip zone 306. The motor casing 302 is coupled with a base assembly 308 which includes a first knob handle 310 and a second knob handle 312. An actuator 314 is disposed on the motor casing 302 for controlling the operation of the router assembly 300. The first and second grip zone 304 and 306 narrow the profile of the router assembly 300. This narrower profile may enable an operator to grasp the router assembly 300 more securely, maintaining increased control during operation. Additionally, a narrower profile may further increase the gripping comfort experienced by the operator of the router assembly 300, thereby reducing muscle fatigue in the hand of the operator. For example, FIG. 4 shows the router assembly 300 being engaged by a hand of an operator. The engagement points of the hand with the router assembly 300 are the first and second grip zone 304 and 306 which allow the operator to establish a secure grasp. In the current embodiment, the thumb engages with the first grip zone 304 and the forefingers engage against the second grip zone 306. As shown, the palm of the hand may be extended away from contact with the motor casing or in the alternative the palm may be engaged against the motor casing.

A router bit engagement assembly 316 couples to a motor disposed within the motor casing 302. A router bit 318 couples with the router bit engagement assembly 316. Similar to the angular adjustment capabilities shown and described for the router assembly 100, in FIGS. 1A through 1D, it is contemplated that the motor casing 302 may present at an angle relative to a horizontal and vertical main axis of the base assembly 308. Further, the motor casing 302 may be removed from the base assembly 308 enabling the base assembly 308 to be engaged by a secondary motor casing or the motor casing 302 to be engaged by a secondary base assembly.

Figure 5:
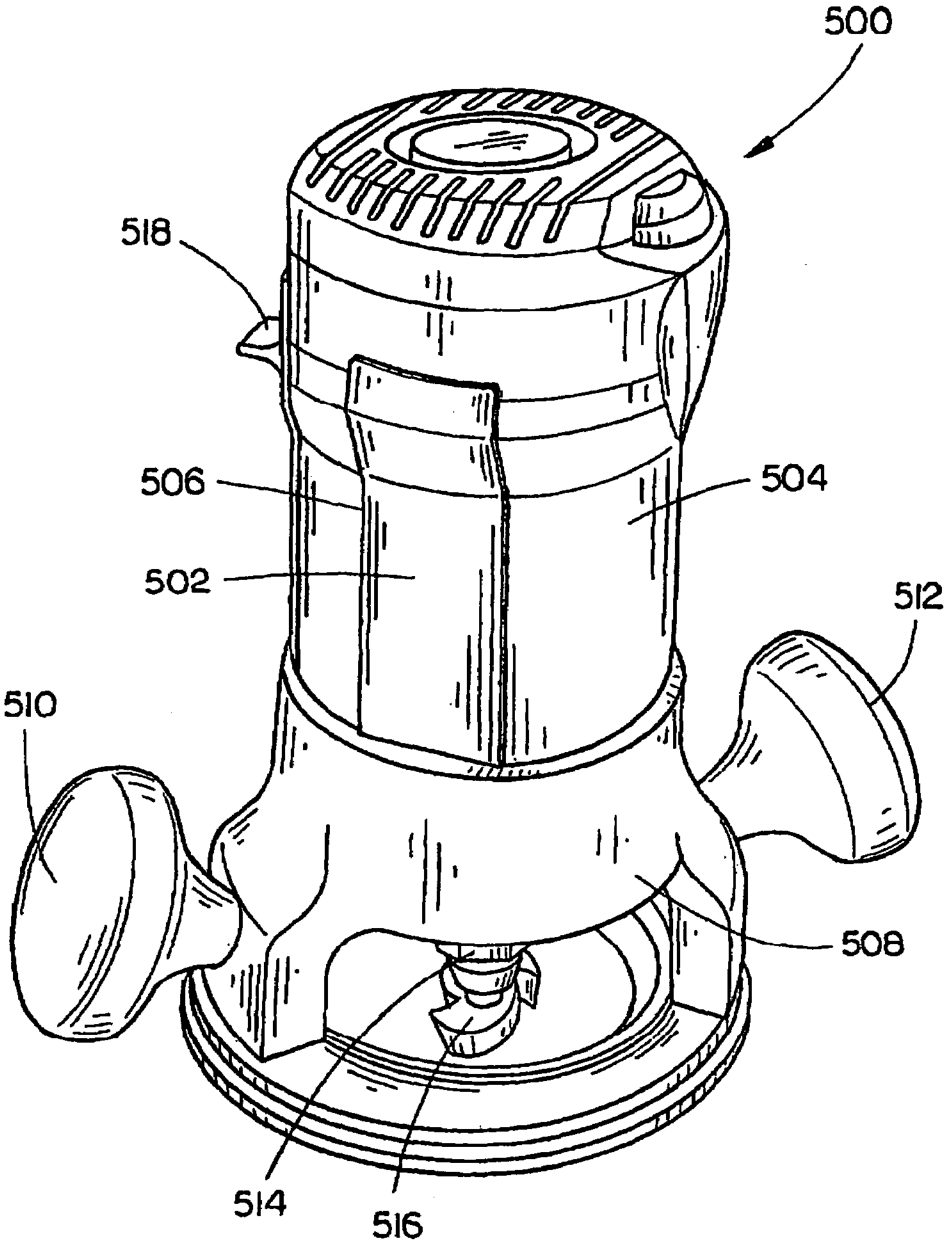
FIG. 5 is an illustration of a router assembly including a motor casing comprising a grip assembly including a first grip zone disposed with a first first grip.

FIG. 5 shows a router assembly 500 including a first grip 502 disposed on a motor casing 504. In the exemplary embodiment, the first grip 502 is disposed upon a first grip zone 506 of a grip assembly of the router assembly 500. The first grip 502 may allow for a more comfortable and secure grasp of the router assembly 500 by an operator. The first grip 502 may be composed of polymeric material, elastomeric material, and the like. In a preferred embodiment, for example, the first grip 502 may be composed of SANOPRENE™, a registered trademark of Roush Industries. The addition of the first grip 502, upon the first grip zone 506, may provide vibration dampening and/or vibration attenuation during operation of the router assembly 500 and may reduce heat transfer from the router assembly 500. It is further contemplated that the first grip 502 may comprise a contoured and/or textured design to enable a firmer grasp by the operator. For example, the first grip 502 may include raised patches, raised lines, relief points, and the like. It is understood that the contouring of the first grip 502 may be varied as contemplated by one of ordinary skill in the art without departing from the scope and spirit of the present invention.

It is understood that the location of the first grip zone 506 and thus the first grip 502 may be varied. In the exemplary embodiment, the first grip zone 506 including the first grip 502 is disposed proximal to a first knob handle 510. This is preferable for a right hand dominant operator of the router assembly 500. Alternatively, the first grip zone 506 and the first grip 502 may be disposed proximal to a second knob handle 512 which provides increased grasping ability and control over the router assembly 500 to a left hand dominant operator. The position of the first grip 502 may be adjusted through use of an adjustment assembly similar to the adjustment assembly described above in reference to FIGS. 1 through 4.

The router assembly 500 further includes a base assembly 508 coupled with the motor casing 504. The base assembly 508 includes the first knob handle 510 and the second knob handle 512. A router bit engagement assembly 514 is coupled with a router bit 516, the router bit engagement assembly 514 being coupled with a motor disposed within the motor casing 504. An actuator 518, for selection of the operation of the router assembly 500, is disposed upon the motor casing 504. As described above, in FIG. 2C, the actuator may be disposed in various locations and comprise a variety of configurations as contemplated by those of ordinary skill in the art.

In the preferred embodiment, the first grip 502 is disposed integrally with the configuration of the motor casing 504. For example, the first grip zone 506 establishes a recess from the plane of the motor casing 504 and the first grip 502, coupled with the first grip zone 506, may fill the recess and re-establish the planar surface. It is contemplated that the first grip 502 may be coupled to the first grip zone 506 of the motor casing 504 using various fastening assemblies. For example, the first grip 502 may be adhered to the first grip zone 506 through a standard manufacture process. The adhering may be accomplished through the use of glue, epoxy, or other substances which provide a similar effect. Alternatively, the first grip 502 may be affixed to the first grip zone 506 of the motor casing 504 through the use of fasteners. Fasteners may include screws, bolts, and the like. Additionally, the first grip 502 may couple with the first grip zone 506 of the motor casing 504 through the use of a magnetic system. The magnetic system may comprise a magnetic strip being placed upon the first grip 502 which is attracted to the metal of the motor casing. Other fastening assemblies may be employed as contemplated by those of ordinary skill in the art.

It is contemplated that the first grip 502 may be removed from the first grip zone 506. Upon removal the first grip 502 may be stored to protect the material composing the first grip 502 and increase its usable life. The enablement of removal may be accomplished through the use of a variety of design implementations. For example, the first grip 502 may be disposed with a loop and hook system. In such an instance, a receiving loop patch may be affixed in position on the first grip zone 506 of the motor casing 504 and be enabled to couple with the first grip 502 which may include a hook patch. Alternatively, when the first grip 502 is secured to the first grip zone 506 through the use of fasteners, as described above, the fasteners may be removed.

Figure 6:
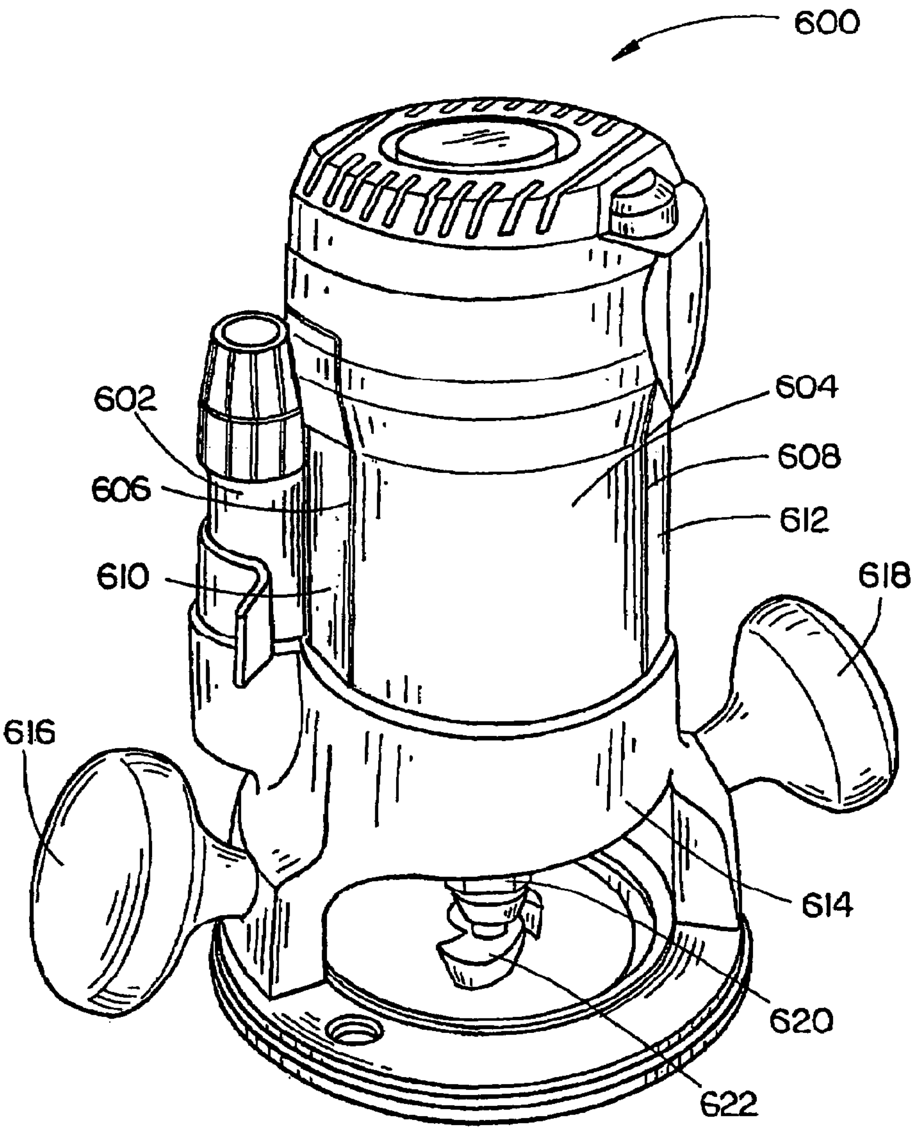
FIG. 6 is an isometric view illustrating a router assembly including a motor casing comprising a grip assembly including a first grip zone disposed with a first grip and second grip zone disposed with a second first grip.

Referring now to FIG. 6, a router assembly 600 including a depth adjustment assembly 602 and a motor casing 604 disposed with a grip assembly comprising a first grip zone 606 and a second grip zone 608, is shown. It is contemplated that the depth adjustment assembly 602 may be of various configurations and that the assembly shown is merely exemplary and not intended to limit or restrict the use of the present invention. In alternative embodiments the router assembly 600 may include one or three or more grip zones. The first grip zone 606 is further disposed with a first grip 610 and the second grip zone 608 is further disposed with a second grip 612. The first and second grip 610 and 612 may be similar to those described above in reference to FIG. 5. The first grip zone 606 is proximal to the depth adjustment assembly 602. The motor casing 604 is coupled with a base assembly 614 which is disposed with a first knob handle 616 and a second knob handle 618. A router bit engagement assembly 620 is coupled with a router bit 622, the router bit engagement assembly 620 being coupled with a motor disposed within the motor casing 604. It is understood that the motor casing 604 and/or the base assembly 614 may present at various angles relative to the main vertical and horizontal axis of the base assembly 614, as described previously in FIGS. 1 through 5.

The first grip 610 and the second grip 612 may be disposed in various locations upon the motor casing 604. Further, it is contemplated that the material composing the first and second grips may be disposed within the first and second grip zones locations or may be disposed continuously upon the motor casing 604, at least partially encompassing the motor casing 604. In an alternative embodiment, the base assembly 614 may be disposed with a grip assembly comprising a first grip zone and a second grip zone. The base assembly first and second grip zones may be located in alignment with the first grip zone 606 and the second grip zone 608 disposed on the motor casing 604. However, the first and second grip zones of the base assembly 614 may be disposed in various locations upon the base assembly 614 not necessarily in alignment with the first grip zone 606 and the second grip zone 608 of the motor casing 604. Further, the base assembly first and second grip zones may be include a base first grip and base second grip, composed of material similar to or varying from the first grip 610 and the second grip 612, disposed on the first and second grip zone 606 and 608, respectively. The manner in which the material of the base first grip and base second grip may be disposed on the base assembly is similar to that described previously in FIG. 5.

It is contemplated that the motor casings and base assemblies shown and described in FIGS. 1 through 6 are enabled to be retrofitted with existing router assemblies. This is advantageous in providing an operator of the router assembly with interchangeable options. It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A router comprising:

a base having a substantially cylindrical sleeve and a support plate for supporting the base on a workpiece; and a motor casing received in the sleeve of the base for slidable movement relative to the base, the motor casing including a first grip and a second grip disposed on substantially opposite sides of the motor casing and separated from one another by intermediate regions of the motor casing, wherein the first grip and the second grip have narrower profiles than the intermediate regions of the motor casing and wherein the first grin comprises an elastomeric material.

2. The router of claim 1 wherein the first grip is configured to receive a thumb of a user and the second grip is configured to receive at least one finger of a user, with a palm of the user against one of the intermediate regions of the motor casing.

3. The router of claim 1 wherein the first grip is configured to receive a thumb of a user and the second grip is configured to receive at least one finger of a user, with a palm of the user spaced from the intermediate regions of the motor casing.

4. A router comprising:

a base having a substantially cylindrical sleeve and a support plate for supporting the base on a workpiece; and a substantially cylindrical motor casing received in the sleeve of the base for slidable movement relative to the base, the motor casing having an outer wall with a first and second grip each adjacent to and separated by a first intermediate region and a second intermediate region, the first and second grips disposed substantially on opposite sides of the motor casing, wherein a distance between the first and second grips is less than a diameter of the motor casing and wherein the base comprises a first base grip aligned with the first grip and a second base grip aligned with the second grip.

5. The router of claim 1 wherein the second grip comprises an elastomeric material.

6. The router of claim 1 wherein the first grip is removeable from the motor casing.

7. The router of claim 6 wherein the second grip is removable from the motor casing.

8. The router of claim 1 wherein the base comprises a first base grip aligned with the first grip and a second base grip aligned with the second grip.

9. The router of claim 1 wherein the base further comprises first and second handles that extend from the base.

10. The router of claim 9 wherein the first grip is positioned proximal the first handle and the second grip is positioned proximal the second handle.

11. The router of claim 1 wherein the motor casing has a substantially cylindrical shape, and a distance between the first and second grips is less than a diameter of the motor casing.

12. The router of claim 1 wherein the first and second grips are disposed on flattened regions of the motor casing.

13. A router comprising:

a base having a substantially cylindrical sleeve and a support plate for supporting the base on a workpiece; and a substantially cylindrical motor casing received in the sleeve of the base for slidable movement relative to the base, the motor casing having an outer wall with a first and second grip each adjacent to and separated by a first intermediate region and a second intermediate region, the first and second grips disposed substantially on opposite sides of the motor casing, wherein a distance between the first and second grips is less than a diameter of the motor casing and wherein the first grip comprises an elastomeric material.

14. The router of claim 13 wherein the second grip comprises an elastomeric material.

15. The router of claim 13 wherein the first grip is removeable from the motor casing.

16. The router of claim 15 wherein the second grip is removable from the motor casing.

17. The router of claim 13 wherein the base comprises a first base grip aligned with the first grip and a second base grip aligned with the second grip.

18. The router of claim 13 wherein the first and second grips extend axially along the motor casing.

19. The router of claim 13 wherein the first and second grips are disposed on flattened regions of the motor casing.

20. A router comprising:

a base; and a motor casing received in the base, the motor casing including a first grip and a second grip disposed on substantially opposite sides of the motor casing and separated from one another by intermediate regions of the motor casing, wherein the first grip and the second grip have narrower profiles than the intermediate regions of the motor casing and wherein the base comprises a first base grip aligned with the first grip and a second base grip aligned with the second grip.

21. The router of claim 20 wherein at least one of the first grip and the second grip comprise an elastomeric material.

22. A router comprising:

a base; and a motor casing received in the base, the motor casing including a first grip and a second grip disposed on substantially opposite sides of the motor casing and separated from one another by intermediate regions of the motor casing, wherein the first grip and the second grip have narrower profiles than the intermediate regions of the motor casing and are disposed on flattened regions of the motor casing and wherein at least one of the first grip and the second grip comprise an elastomeric material.

23. A router comprising:

a base; and a substantially cylindrical motor casing received in the base, the motor casing having an outer wall with a first and second grip each adjacent to and separated by a first intermediate region and a second intermediate region, the first and second grips disposed substantially on opposite sides of the motor casing, wherein a distance between the first and second grips is less than a diameter of the motor casing and wherein the base comprises a first base grip aligned with the first grip and a second base grip aligned with the second grip.

24. The router of claim 23 wherein at least one of the first grip and the second grip comprise an elastomeric material.

25. A router comprising:

a base; and a substantially cylindrical motor casing received in the base, the motor casing having an outer wall with a first and second grip each adjacent to and separated by a first intermediate region and a second intermediate region, the first and second grips disposed substantially on opposite sides of the motor casing, wherein a distance between the first and second grips is less than a diameter of the motor casing and the first and second grips are disposed on flattened regions of the motor casing wherein at least one of the first grip and the second grip comprise an elastomeric material.

26. A router comprising:

a base having a substantially cylindrical sleeve and a support plate for supporting the base on a workpiece; and a motor casing received in the sleeve of the base for slidable movement relative to the base, the motor casing including a first grip and a second grip disposed on substantially opposite sides of the motor casing and separated from one another by intermediate regions of the motor casing, wherein the first grip and the second grip have narrower profiles than the intermediate regions of the motor casing and wherein the first grip is removeable from the motor casing.

27. The router of claim 26 wherein the second grip is removable from the motor casing.

28. A router comprising:

a base having a substantially cylindrical sleeve and a support plate for supporting the base on a workpiece; and a substantially cylindrical motor casing received in the sleeve of the base for slidable movement relative to the base, the motor casing having an outer wall with a first and second grip each adjacent to and separated by a first intermediate region and a second intermediate region, the first and second grips disposed substantially on opposite sides of the motor casing, wherein a distance between the first and second grips is less than a diameter of the motor casing and wherein the first grip is removeable from the motor casing.

29. The router of claim 28 wherein the second grip is removable from the motor casing.

30. A router comprising:

a base having a substantially cylindrical sleeve and a support plate for supporting the base on a workpiece; and a motor casing received in the sleeve of the base for slidable movement relative to the base, the motor casing including a first grip and a second grip disposed on substantially opposite sides of the motor casing and separated from one another by intermediate regions of the motor casing, wherein the first grip and the second grip have narrower profiles than the intermediate regions of the motor casing and wherein the base comprises a first base grip aligned with the first grip and a second base grip aligned with the second grip.

* * * * *